(12) United States Patent
Borgen

(10) Patent No.: US 7,156,037 B2
(45) Date of Patent: Jan. 2, 2007

(54) DEVICE FOR A WIND POWER STATION PLACED IN DEEP WATER

(75) Inventor: Eystein Borgen, Hundvag (NO)

(73) Assignee: Sway AS (NO)

( * ) Notice: Subject to any disclaimer, the term of this patent is extended or adjusted under 35 U.S.C. 154(b) by 0 days.

(21) Appl. No.: 10/515,234

(22) PCT Filed: May 16, 2003

(86) PCT No.: PCT/NO03/00161

§ 371 (c)(1),
(2), (4) Date: May 5, 2005

(87) PCT Pub. No.: WO03/098038

PCT Pub. Date: Nov. 27, 2003

(65) Prior Publication Data

US 2005/0229836 A1    Oct. 20, 2005

(30) Foreign Application Priority Data

May 22, 2002    (NO) .................................. 20022426

(51) Int. Cl.
*B63B 35/44*    (2006.01)
(52) U.S. Cl. ........................................ 114/264; 290/44

(58) Field of Classification Search ................ 114/264; 290/44, 51, 55; 415/4.3, 4.5; 60/398
See application file for complete search history.

(56) References Cited

U.S. PATENT DOCUMENTS 6,766,643 B1 * 7/2004 Christensen ................. 60/398
6,891,280 B1 * 5/2005 Siegfriedsen ................ 290/44

FOREIGN PATENT DOCUMENTS

| DE | 197 44 174 A1 | 4/1999 |
|---|---|---|
| EP | 1288122 A2 | 3/2003 |
| WO | WO 02/10589 A1 | 2/2002 |
| WO | WO 02/052150 A1 | 7/2002 |
| WO | WO 03/004869 A1 | 1/2003 |

* cited by examiner

*Primary Examiner*—Lars A. Olson
(74) *Attorney, Agent, or Firm*—Akerman Senterfitt

(57) ABSTRACT

A wind-driven power station mounted floating in deep water, comprising a machine house (8) including a generator (not s shown), regulating devices (not shown), rotor axle (9) and rotor blade (10), in which the machine house (8) is mounted at a tower (2) that mainly is floating in an upright position, and where the stability of the tower (2) is provided by means of ballast (5, 6) being placed in the lower part of the tower (2). The power station is kept in position and stabilized by means of anchor systems (12, 13, 14, 15, alternatively 16, 17, 18).

11 Claims, 3 Drawing Sheets

DEVICE FOR A WIND POWER STATION PLACED IN DEEP WATER

This invention is related to a wind-driven power plant (hereafter referred to as a windmill) that is installed floating in deep water, complete with an anchoring to the bottom of the sea.

Previously known technology includes windmills erected on land and windmills erected in near-shore areas. The technique applied is to an essential degree common in that a secure foundation is provided, adapted to the size of the windmill, the dimensioning wind force, etc.

According to the previous technology for building windmills in the sea, a foundation extending above the sea surface is erected. An ordinary windmill tower is mounted on the foundation. The machine house of the windmill including the generator, regulating devices, rotor and rotor blades is mounted on the top of this tower. These devices are designed in the same way as for a windmill built on dry land.

By preference, windmills are erected in places with stable wind conditions. Most often they stand on ridges or they are placed in the flat, open countryside. Thereby they become easily noticeable, and due to their dominating position and tall structure, windmills are often perceived as a visual environmental problem, an alien substance in the nature.

When in use, the windmills develop noise, particularly from the rotor blades. When placed near habitations, the windmills will thus constitute a noise problem for the population.

Wind power is regarded as a "green" energy type. Wind is an energy source that is always available, and an exploitation of wind as an energy source, is regarded as desirable from an environmental point of view. The production of electric energy by means of windmills does not cause any harmful emissions to nature.

Wind energy cannot be stored, and must therefore be utilized when available. Water, on the other hand, can be stored in magazines. By combining wind-based and hydroelectric power plants in a joint distribution net, it is possible to reduce the water consumption when the wind conditions are favourable. When the windmills cannot be used to produce electric energy, the water-based production is increased. In this way, production systems can be established, that always ensure a maximal exploitation of the wind energy sources, without making the energy supply to the market unstable.

Bt preference, windmills are placed where the average wind force is as high as possible. In this way, the energy production is maximized, and the production cost is minimized.

Comprehensive meteorological records show that the average wind force increases when moving from the seashore to the open sea. For example, at the oil installations in the northern part of the North Sea, the average wind velocity is approximately 25% higher than at good windmill locations at the Danish West Coast.

The exploitable wind energy is proportional to the wind velocity raised to the third power. Thus, a 25% increase in the wind velocity represents an increase of the energy potential by $1.25^3=1.95$, i.e. +95%. Placing windmills in the open sea thus gives good conditions for an increased production potential.

It is known technology to place small windmills on ships to produce electric energy for captive use.

Still, it is not profitable to install large, power producing windmills on ordinary, ship resembling floating installations. The movements of the hull in rough sea will cause very great strain on the structures of the windmills, and the hull has to be of large dimensions in order that the structure can attain sufficient stability to absorb the wind forces acting on the windmill rotor.

The offshore oil production requires large quantities of electric energy. At present, this is by and large provided by means of gas turbines. The combustion of large quantities of gas constitutes a marked environmental problem because carbon dioxide ($CO_2$) is emitted to the atmosphere. Great environmental gains can be achieved by substituting environmentally friendly energy production for gas-based production. Therefore, large amounts of money are being invested in establishing transfer cables for electric power from land.

The objective of the present invention is to remedy the disadvantages associated with the previous technique.

In accordance with the present invention, this objective is achieved by the features discussed in the description below and in the subsequent patent claims.

A cylindrical tower is kept floating in water in an upright position by means of solid and liquid ballast materials in the lower part of the tower. A windmill with a machine house comprising generator, regulating devices, rotor and rotor blades is placed in the upper part of the tower.

Alternatively, the generator can be placed in the central part of the tower and connected to the rotor axle by means of a suitable transmission.

The total dimensions of the tower are adapted to the size of the windmill, dimensioning wind force and wave height, etc. Since the joint centre of gravity of the structure is below the centre of displaced mass of water, the tower shows a better stability than an ordinary ship hull comprising a corresponding weight of steel.

The connection between the machine house and the tower is designed in such a way that the rotor axle of the windmill is maintained in an horizontal position by means of an in itself known regulating device, even if the tower is tilting on one side due to the strain on the various sections of the structure caused by wind, waves and currents in the water.

By preference, the rotor is placed on the leeward side of the machine house. Thereby, a stabilising effect is achieved on the wind forces that attempt to turn the tower into the wind direction, and the risk that the rotor blades will smash into the tower when it is tilting, is reduced.

Alternatively, the generator is placed in the tower. Thereby, complicating devices for lead-through of electric cables to the generator are avoided. A revolving machine house mounted in the upper part of the tower, necessitates transfer from the machine house to the tower by means of sliding contacts, or by limiting the number of revolutions to which the machine house can be subjected before it is revolved in the opposite direction by means of engine power. Sliding contacts can only be used in connection with transfer of relatively small effects. Forced revolution of the machine house is risky if it is carried out when the tower is tilting. In such a situation, the rotor blades can smash into the tower.

The tower is anchored to the bottom of the sea with suitable contrivances. The anchoring of the tower acts as means of both positioning and stabilising. The anchoring system is constructed to prevent the tower from revolving under the influence of torsion forces caused by the rotation of the windmill. Primarily, the anchoring is executed by means of an anchor rod fastened to the sea bottom by means of an anchoring point with a gravitation anchor, a suction anchor or poles and, optionally, secured with filler masses. The anchor rod includes two joints that transfer torsion and tensile forces to the bottom anchoring point but prevent bending strain from acting on the rod. This anchoring system requires little space and is used with advantage if the windmill is placed at or close to a fishing ground.

Alternatively, the windmill can be anchored by means of one or several ordinary bottom anchors. These are connected to outriggers at the tower to absorb the torsion forces.

During anchoring, the windmill is overloaded with ballast to bring it to sink so deep that, after de-ballasting and independent of tide and waves, there are always tensile forces acting on the anchor/rod connection.

The windmill is connected to an electric power distribution net. By preference, several windmills are placed in the same area in order that the main connection to a remote distribution net can be utilized as efficiently as possible.

In the following a non-limiting example of a preferred embodiment is described and visualized in the attached drawings, where:

FIG. 1 shows a side view of a windmill with the upper part of the tower above the sea surface, with the machine house mounted in the upper part of the tower. The rotor is turned against the leeward side, and the tower is tilting in the wind direction. The lower part of the tower is connected to the seabed by means of an anchor rod with two joints.

Figure 1:
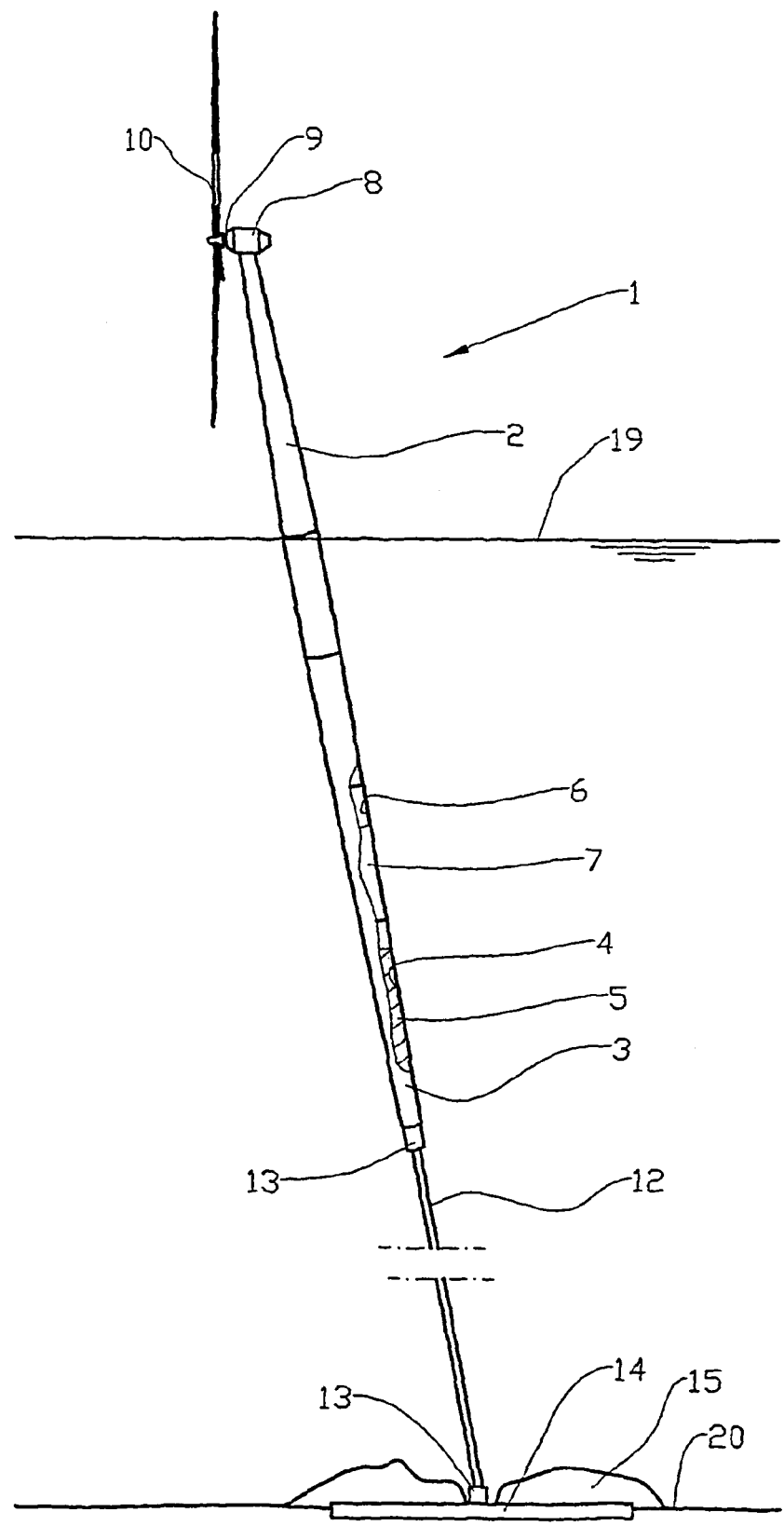
Figure 2:
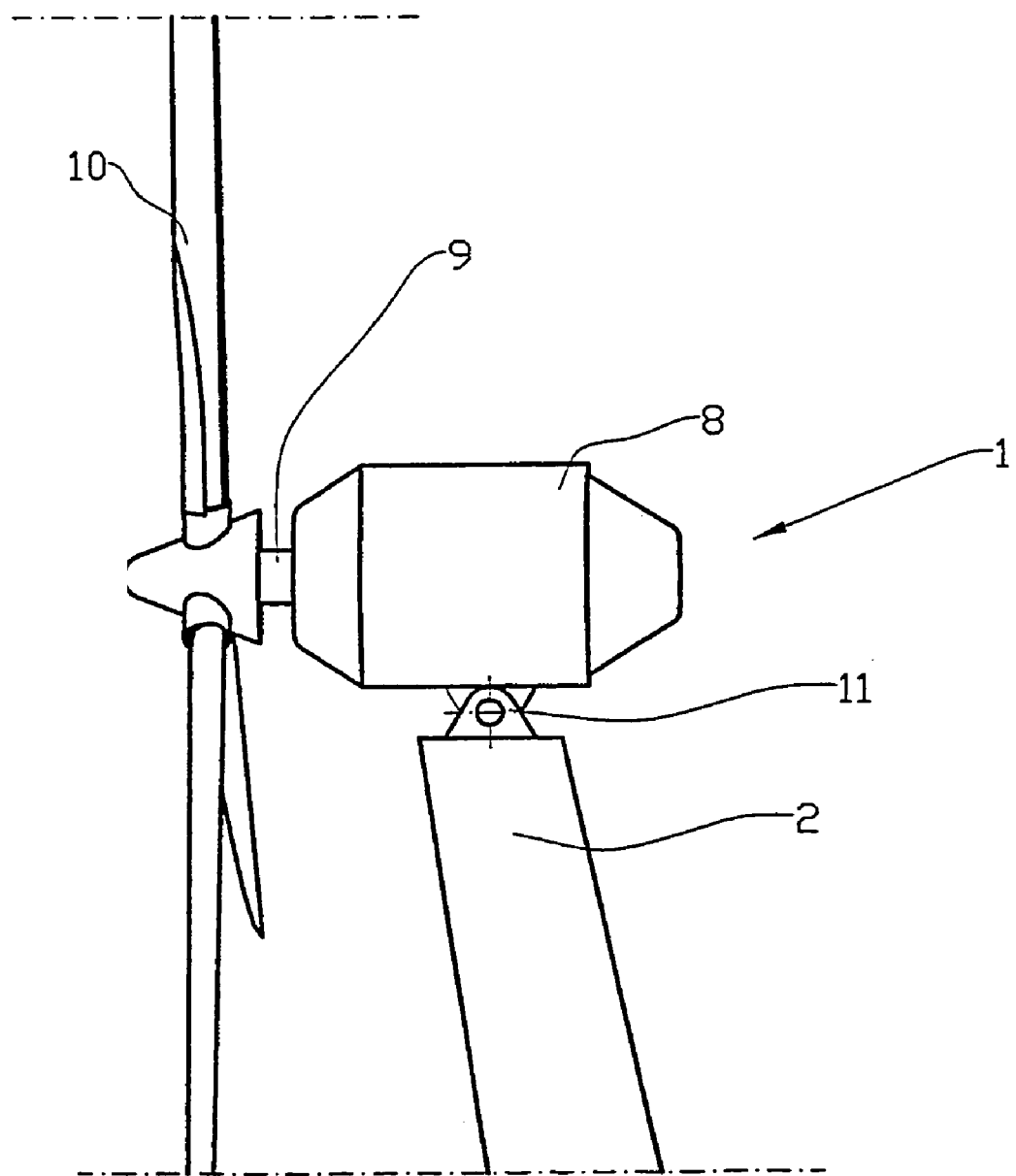
FIG. 2 shows a detail of the connection between the machine house and the tower.
Figure 3:
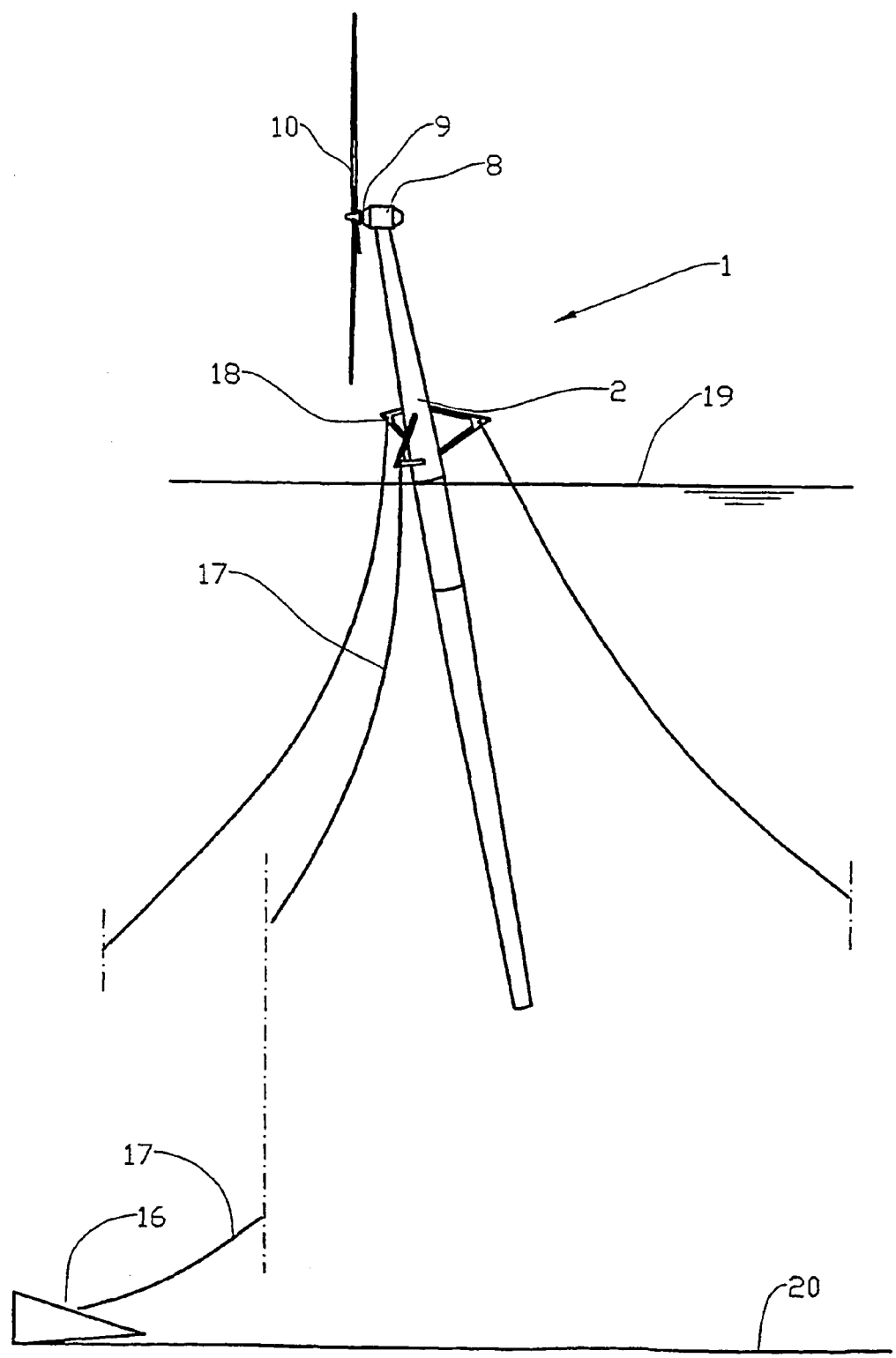
FIG. 3 shows the alternative anchoring system with three bottom anchors, anchor chains and outriggers.

In the drawings, the reference number 1 denotes a windmill comprising a cylindrical tower 2 with a tower bottom 3, a ballast room 4 containing a ballast material 5 that by preference is a solid, a ballast tank 6 containing a liquid ballast 7, the machine house of the windmill 8 with rotor axle 9, rotor blade 10, and, not shown, a generator and regulating devices. The machine house 8 is hinged to the tower 2 by means of a tilting joint 11. An anchor rod 12, complete with the joint 13, connects the windmill 1 to a bottom anchoring 14 that is secured by a gravitation anchor, suction anchor or poles (not shown) and optionally stabilized by filler masses 15.

An alternative embodiment of the anchoring system comprises one or several bottom anchors 16, complete with anchor chain 17 and outrigger 18.

The water surface is denoted by reference number 19 and the sea bottom by reference number 20.

The stability of the windmill 1 is maintained by the centre of gravity of the entire structure being placed significantly lower than the attack point of the buoyant forces of the submerged part of the tower 2. This is achieved by a ballast material 5 being placed in a ballast room 4 in the lower part of the tower 2. By use of an adapted amount of a liquid ballast material, e.g. water, in a ballast tank 6, the total ballast weight can be adapted to the weight actually needed to lower the windmill 1 into the water.

By means of torsionally rigid anchor connection(s) 12, 13, 14, alternatively 16, 17, 18, to the sea bottom 20, the windmill 1 is kept in position. By temporary overfilling with liquid ballast, resulting in the windmill 1 being lowered to a greater depth than its calculated permanent depth in the water, the tower is connected to the anchor system 12, 13, 14. By the subsequent removal of water by pumping, a permanent tension is established in the anchor system 12, 13, 14, so that the windmill 1 remains positioned at a constant depth in relation to the sea bottom 20, independent of tide and waves. Thereby, the stability of the windmill 1 is increased.

The machine house 8 of the windmill 1 is placed in the upper part of the tower 2 and can be revolved in relation to the wind direction in accordance with known technique.

Alternatively, the generator of the windmill 1 is placed in the central part of the tower 2. In this embodiment the stability of the windmill 1 is increased because the weight of the machine house 8 is being reduced.

Wind pressure against the rotor blades 10 of the windmill 1 and other structures, as well as wave forces and currents in the water, will cause the tower 2 to tilt to one side. The tilting is balanced by the counteracting resulting force component of the weight of the windmill 1 and the buoyancy of the windmill 1 in the water.

By means of a tilting joint 11, complete with an automatic regulating device, the rotor axle 9 of the windmill 1 is kept in a horizontal position even when the tower 2 is tilting. Thereby a greater efficiency is maintained and there will be less strain on the rotor blade 10.

During normal operating conditions, the machine house 8 of the windmill 1 is turned to a position with the rotor blades 10 on the leeward side. In this position, the risk that the rotor blades 10 will smash into the tower 2 is reduced. At the same time, a stabilizing effect has been achieved on the wind forces that attempt to turn the tower 2 in the wind direction.

Since, during operation, the rotor axle 9 is not mounted right-angled to the tower 2; a component of this torque will be transferred to the tower. The anchoring system 12, 13, 14, alternatively 16, 17, 18, of the tower 2 is designed in such a way that it prevents the tower 2 from being revolved by this torque. The anchor rod 12 of the primary anchor system complete with the joint 13 and the bottom anchoring point 14 is torsionally rigid. At the same time, the joints 13 prevent bending strain on the rod 12. In the same way, the outriggers 18 of the alternative anchoring system absorb the torsion forces, that are transferred to the bottom anchors 16 through the anchor chains 17 that are fastened to the outriggers 18 far away from the centre axis of the tower 2.

The invention claimed is:

1. A wind-driven power station that is mounted in a floating state in water, comprising:
   a tower;
   a windmill connected to an upper part of the tower;
   an anchor rod connected to a lower part of the tower under tension;
   a bottom anchor secured to a sea bed; and
   a joint connecting the anchor rod and the bottom anchor,
   wherein the tower is permitted to float, to an essential degree, in an upright position, because the total center of gravity of the wind-driven power station is located below the buoyancy center of the wind-driven power station,
   wherein the anchor rod under tension and the joint provide a torsionally rigid connection, preventing rotation of the tower due to torque transmitted by the windmill; and
   wherein the joint allows the tower to tilt to the side due to strains caused by wind, waves and currents in the water.

2. An arrangement as claimed in claim 1, wherein a ballast room filled with a ballast material and a ballast tank arranged to accept liquid ballast are arranged in the lower part of the tower.

3. An arrangement as claimed in claim 1, wherein the anchor rod is connected to an upper joint that is fastened to a lower portion of the tower, each joint being arranged for transfer of torsion and tensile forces.

4. An arrangement as claimed in claim 3, wherein the upper joint is a tilting joint.

5. An arrangement as claimed in claim 1, wherein a machine house is positioned in such a way that, during operation, rotor blades of the wind-driven power station are positioned on the leeward side of the tower.

6. An arrangement as claimed in claim 1, wherein a generator is mounted in the tower and connected to a rotor axle by means of a transmission arrangement.

7. An arrangement as claimed in claim 1, wherein the tower and a floating substructure consist of a single body.

8. An arrangement as claimed in claim 1, wherein portions of the tower or the entire tower have a cylindrical cross section.

9. An arrangement as claimed in claim 1, wherein the tower consist of an upper and a lower section.

10. A wind-driven power station that is mounted in a floating state, comprising a tower floating, to an essential degree, in an upright position because the total center of gravity of the wind-driven power station is located below the buoyancy center of the wind-driven power station,
  wherein the wind-driven power station is positioned and stabilized by means of a torsionally rigid connection to the bottom of the sea,
  wherein the torsionally rigid connection comprises an anchor rod under tension, and
  wherein a tilting joint is placed in the transmission between a machine house and the tower to keep a rotor axle in a horizontal position even if the tower is tilting.

11. A wind-driven power station that is mounted in a floating state in water, comprising:
  a tower;
  a windmill connected to an upper part of the tower;
  an anchor rod connected to a lower part of the tower under tension;
  a bottom anchor secured to a sea bed; and
  a joint connecting the anchor rod and the bottom anchor,
  wherein the tower is permitted to float, to an essential degree, in an upright position, because the total center of gravity of the wind-driven power station is located below the buoyancy center of the wind-driven power station, and
  wherein the tower exhibits the shape of a single pole with a draft of at least 8 times the average diameter of the submerged part of the tower.

* * * * *